United States Patent
Chen et al.

(10) Patent No.: US 9,298,242 B2
(45) Date of Patent: Mar. 29, 2016

(54) OPTICAL MOUSE APPARATUS FOR ADJUSTING EXPOSURE OF SENSED IMAGE OUTPUT AND RELATED METHOD THEREOF

(71) Applicant: PixArt Imaging Inc., Hsin-Chu (TW)

(72) Inventors: Chun-Wei Chen, Hsin-Chu (TW); Ching-Lin Chung, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 219 days.

(21) Appl. No.: 13/911,069

(22) Filed: Jun. 5, 2013

(65) Prior Publication Data

US 2014/0210722 A1 Jul. 31, 2014

(30) Foreign Application Priority Data

Jan. 30, 2013 (TW) ............................. 102103510 A

(51) Int. Cl.
*G06F 3/033* (2013.01)
*G09G 5/08* (2006.01)
*G06F 1/32* (2006.01)
*G06F 3/03* (2006.01)
*G06F 3/0354* (2013.01)

(52) U.S. Cl.
CPC ................ *G06F 1/32* (2013.01); *G06F 3/0317* (2013.01); *G06F 3/03543* (2013.01)

(58) Field of Classification Search
CPC ....................................................... G06F 3/0304
USPC .......................................................... 345/166
See application file for complete search history.

(56) References Cited

U.S. PATENT DOCUMENTS

| | | | |
|---|---|---|---|
| 2008/0106635 A1* | 5/2008 | Lin et al. | 348/362 |
| 2009/0109440 A1* | 4/2009 | Wu et al. | 356/445 |
| 2009/0195505 A1* | 8/2009 | Chen et al. | 345/166 |
| 2012/0020529 A1* | 1/2012 | Chen et al. | 382/107 |

* cited by examiner

*Primary Examiner* — Kwang-Su Yang
(74) *Attorney, Agent, or Firm* — Winston Hsu; Scott Margo

(57) ABSTRACT

A method used in an optical mouse apparatus includes: generating and emitting a light signal which is emitted to a surface so as to reflect and generate a light reflected signal; generating sensed image(s) according to the light reflected signal wherein the sensed image(s) are used for estimating an offset of the optical mouse apparatus; dynamically adjusting photometric exposure for the sensed image(s) according to a quality parameter, a moving speed, or an output offset number per unit time of the sensed image(s).

11 Claims, 4 Drawing Sheets

OPTICAL MOUSE APPARATUS FOR ADJUSTING EXPOSURE OF SENSED IMAGE OUTPUT AND RELATED METHOD THEREOF

BACKGROUND OF THE INVENTION

1. Field of the Invention

The disclosed embodiments of the present invention relate to an optical mouse mechanism, and more particularly, to an optical mouse apparatus and a method utilized in an optical mouse apparatus.

2. Description of the Prior Art

Generally speaking, the conventional optical mouse has a photosensitive element used for obtaining multiple sensed images, where information of the displacement detection is obtained according to correlations between the multiple sensed images. With regard to the exposure of the sensed image, although the conventional optical mouse can determine the exposure value of the above-mentioned sensed image, it is only limited to calculation of the average brightness of the whole sensed image for allowing the average brightness of the sensed image to be within a predetermined exposure range. To put it another way, the current optical mouse only adjusts the exposure value of the sensed image within a predetermined range regardless of the sensed image quality or the usage status/environment of the optical mouse. This kind of exposure determination mechanism is power-consuming for a portable optical mouse such as a wireless optical mouse. Therefore, the standby time of the portable optical mouse is likely to be limited. In addition, the adjustment of the exposure is highly correlated to the quality of the sensed image. Hence, reduction of the exposure indicates the signal intensity of the sensed image would be reduced, which affects the image quality and leads to excessive errors of the displacement detection. However, the current optical mouse techniques do not take into account the exposure adjustment for power saving while remaining the signal intensity of the sensed image and reducing the error of the displacement detection.

SUMMARY OF THE INVENTION

Therefore, one of the objectives of the present invention is to provide an optical mouse apparatus and a method utilized in an optical mouse apparatus, for achieving exposure adjustment for power saving while remaining the signal intensity of the sensed image and reducing the error of the displacement detection, to solve the problem of the prior art.

According to a first embodiment of the present invention, an optical mouse apparatus is disclosed. The optical mouse apparatus includes a light source unit, a sensing unit, and a processing unit. The light source unit is arranged for generating and emitting an optical signal, which is emitted to a surface, and thereby forming an optical reflected signal. The sensing unit is arranged for generating a sensed image output according to the optical reflected signal, wherein the sensed image output is utilized for estimating an image displacement of the optical mouse apparatus. The processing unit is coupled to the light source unit and the sensing unit, arranged for controlling the light source unit to emit the optical signal and controlling an exposure of the sensed image output to alter between at least two exposure value ranges dynamically according to the sensed image output.

According to a second embodiment of the present invention, an optical mouse apparatus is disclosed. The optical mouse apparatus includes a light source unit, a sensing unit, and a processing unit. The light source unit is arranged for generating and emitting an optical signal, which is emitted to a surface, and thereby forming an optical reflected signal. The sensing unit is arranged for generating a sensed image output according to the optical reflected signal, wherein the sensed image output is utilized for estimating an image displacement of the optical mouse apparatus. The processing unit is coupled to the light source unit and the sensing unit, arranged for controlling the light source unit to emit the optical signal and controlling an exposure of the sensed image output according to a quality parameter, a moving speed, or a unit time output number.

According to a third embodiment of the present invention, a method utilized for an optical mouse apparatus is disclosed. The method includes: generating and emitting an optical signal, which is emitted to a surface, and thereby forming an optical reflected signal; generating a sensed image output according to the optical reflected signal, wherein the sensed image output is utilized for estimating an image displacement of the optical mouse apparatus; and controlling an exposure of the sensed image output to alter between at least two exposure value ranges dynamically according to the sensed image output.

According to a fourth embodiment of the present invention, a method utilized for an optical mouse apparatus is disclosed. The method includes: generating and emitting an optical signal, which is emitted to a surface, and thereby forming an optical reflected signal; generating a sensed image output according to the optical reflected signal, wherein the sensed image output is utilized for estimating an image displacement of the optical mouse apparatus; and controlling an exposure of the sensed image output according to a quality parameter, a moving speed, or a unit time output number.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
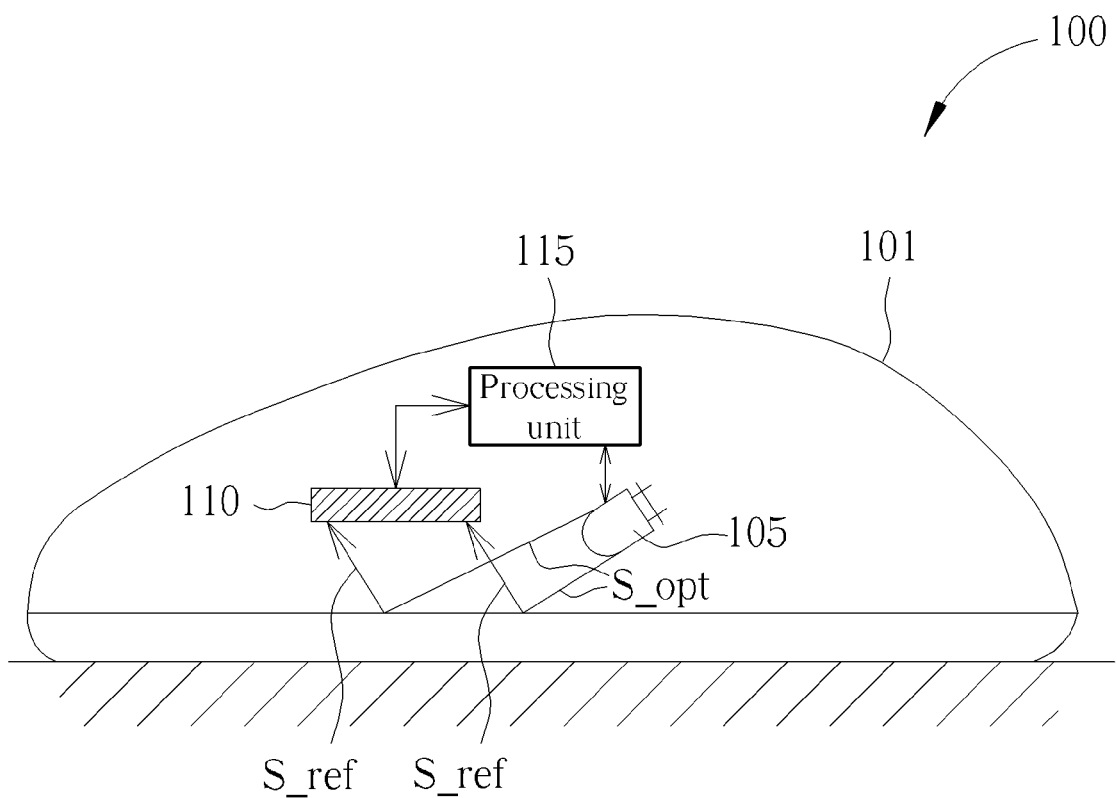
FIG. 1 is a block diagram illustrating an optical mouse apparatus according to a preferred embodiment of the present invention.

Please refer to FIG. 1, which is a block diagram illustrating an optical mouse apparatus 100 according to a preferred embodiment of the present invention. The optical mouse apparatus 100 includes a housing 101, a light source unit 105, a sensing unit 110, and a processing unit 115, wherein the light source unit 105 is arranged for generating and emitting an optical signal S_opt. In practice, the light source unit 105 may be implemented using a light emitting diode (LED) or a laser diode. The optical signal S_opt is emitted upon a surface, and then forms an optical reflected signal S_ref. The sensing unit 110 is arranged for generating a sensed image output according to the optical reflected signal S_ref, wherein the sensed image output is utilized for estimating an image displacement of the optical mouse apparatus 100. For instance, the optical mouse apparatus 100 is able to calculate the image displacement of the shadow accordingly based on the position of the shadow of a cursor in a plurality of images of the sensed image output, thereby estimating the cursor displacement. In addition, the images of the sensed image output could be also provided to the processing unit 115 as reference for determining an exposure of the optical mouse apparatus 100. The processing 115 is coupled to the light source unit 105 and the sensing unit 110, and is arranged for controlling the light source unit 105 to emit the optical signal S_opt and control the exposure of the sensed image output to switch between at least two exposure value ranges dynamically according to the sensed image output, thus reducing the current consumption of the whole system and accordingly achieving the power saving purpose. In other words, the present invention dynamically raises or reduces the exposure of the sensed image output according to different usage status to thereby achieve exposure adjustment for power saving while remaining the signal intensity of the sensed image and reducing the error of the displacement detection. Hence, the problem of the prior art is solved.

In detail, the image brightness is expressed by a gray value distribution (e.g., 0-255). For instance, in this embodiment, the two exposure value ranges may be a gray value range of 100-150 and a gray value range of 70-120. If the processing unit 115 determines to reduce the exposure according to the sensed image output composed of sensed image (s), the processing unit 115 will make the gray value range switched from 100-150 to 70-120 for saving power consumption. If the processing unit 115 determines to raise the exposure according to the sensed image output composed of sensed image (s), the processing unit 115 will make the gray value range switched from 70-120 to 100-150 for enhancing the signal power. In practice, the present invention is not limited to two different exposure value ranges. For example, using three or more exposure value ranges is also feasible. In addition, the aforementioned gray value setting of the gray value ranges is only an embodiment of the present invention, but not a limitation. Any other values are all applicable to the present invention.

Specifically, in the first embodiment, the processing unit 115 calculates a quality parameter (corresponding to the signal intensity) of a sensed image output, and refers to the quality parameter to dynamically adjust the exposure of the sensed image output to switch between at least two exposure value ranges. For instance, the quality parameter is a signal-to-noise ratio (SNR). If the processing unit 115 detects that the SNR of the sensed image output is higher than a first signal threshold QTH1, this indicates that the current image signal intensity is strong, and also indicates that the quality of the sensed image output is good. Thus, the accuracy of displacement estimation performed using the sensed image output is high, and the exposure of the sensed image output is allowed to be gradually reduced for saving power consumption. Therefore, the processing unit 115 decides to adjust and reduce the exposure by switching the exposure from the first exposure value range to the second exposure value range, wherein the first exposure value range is higher than the second exposure value range. For instance, the first exposure value range may be the above-mentioned gray value range of 100-150, and the second exposure value range may be the above-mentioned gray value range of 70-120. Furthermore, if the processing unit 115 detects that the SNR of the sensed image output is too low, this indicates that the quality of the current sensed image is poor, and also indicates that the accuracy of displacement estimation performed by using the sensed image output is low (i.e., the displacement error would be larger). In practice, the processing unit 115 refers to a second signal threshold QTH2 to determine whether the quality of the sensed image output becomes poorer. When it is determined that the quality of the sensed image output becomes poorer, the processing unit 115 decides to adjust and increase the exposure gradually by switching the exposure from the second exposure value range to the first exposure value range for achieving sensed image exposure enhancement.

Please note that the above-mentioned first signal threshold QTH1 is used to determine whether the signal quality/intensity of the sensed image is good or not, and the second signal threshold QTH2 is used to determine whether the signal quality/intensity of the sensed image becomes poor or not, wherein the first signal threshold QTH1 is higher than the second signal threshold QTH2. Since the quality/intensity of the sensed image typically has a certain tendency characteristic as well as less instantaneous change, using two different signal thresholds for determining the quality/intensity of the sensed image output can improve the accuracy of the judgment. However, in other embodiments, in order to save the cost of the circuit, a single signal threshold may be employed for determining whether the signal quality/intensity of the sensed image is good or not. This also belongs to the scope of the present invention.

In the second embodiment, the processing unit 115 calculates a displacement parameter of the sensed image output composed of sensed image (s), and dynamically adjusts the exposure of the sensed image output according to the displacement parameter to switch between at least two exposure value ranges. Specifically, in this embodiment, the displacement parameter indicates a mouse moving speed, wherein the high moving speed (i.e. the mouse is moving at high speed) indicates the moving displacement of the mouse at this moment is larger. With regard to the displacement estimation of the sensed image output, some errors are permitted/allowed, and the requested quality of the sensed image output is allowed to be lower. In other words, there is no need for a high intensity image signal. That is, when the mouse moves at a higher speed, the exposure may be reduced for saving power. However, when the displacement parameter indicates that the mouse moves at a lower speed (i.e., the mouse is moving slowly), this indicates that the moving displacement of the mouse is smaller. For the displacement estimation of the sensed image, some errors are not permitted/allowed, and the requested quality of the sensed image output should be higher. In other words, there is a need for a high intensity image signal. Therefore, the processing unit 115 can decide the current exposure according to the speed type (i.e., the high moving speed or the low moving speed) obtained by comparing the speed threshold with the mouse moving speed indicated by the displacement parameter. Specifically, when the mouse moving speed is higher than a first speed threshold STH1, the processing unit 115 reduces the exposure by switching the exposure from the first exposure value range to the second exposure value range for saving power, wherein the first exposure value range is higher than the second exposure value range. For instance, the first exposure value range may be the above-mentioned gray value range of 100-150, and the second exposure value range may be the above-mentioned gray value range of 70-120. When the processing unit 115 detects that the mouse moving speed is lower than a second speed threshold STH2, the processing unit 115 increases the exposure by switching the exposure from the second exposure value range to the first exposure value range.

Please note that the above-mentioned first speed threshold STH1 is used to determine whether the moving speed of the mouse becomes higher for high-speed movement, and the second speed threshold STH2 is used to determine whether the moving speed of the mouse becomes lower for low-speed movement. Since the moving speed of the mouse typically has a certain tendency characteristic as well as less instantaneous change, using two different speed thresholds for determining the moving speed of the mouse can improve the accuracy of the judgment. However, in other embodiments, in order to save the cost of the circuit, a single speed threshold may be employed for determining the mouse moving speed. This also belongs to the scope of the present invention. In addition, the aforementioned mouse moving speed may be the actual moving speed of the mouse or the moving speed of a mouse cursor. The processing circuit 115 can calculate the actual moving speed of the mouse according to the estimated displacement of the sensed image, or calculate the moving speed of the mouse cursor according to the estimated displacement and the resolution of the display screen. Because the actual moving speed of the mouse varies proportionally to the moving speed of the mouse cursor, utilizing either the above-mentioned actual moving speed of the mouse or the moving speed of the mouse cursor is able to determine whether the optical mouse is at high moving speed or low moving speed. This alternative design also belongs to the scope of the present invention.

Furthermore, in the third embodiment, the above-mentioned displacement parameter indicates a displacement output number of the optical mouse apparatus 100 within a unit time (i.e., the number of displacement outputs within the unit time). The processing unit 115 counts the displacement output number within the unit time, and determines whether to dynamically adjust the exposure of the sensed image according to the displacement output number within the unit time. The optical mouse apparatus 100 generates sensed images and estimates displacement at a fixed frequency, and outputs the estimated displacement to the corresponding host terminal. If the signal intensity of the sensed image is weak to make the currently estimated displacement result inaccurate, then the optical mouse apparatus 100 does not output the currently estimated displacement result, but uses the accurate displacement result estimated previously to reduce the cursor jitter. Hence, if the displacement output number of the optical mouse apparatus 100 within the unit time is higher than a certain level, it will indicate that the sensed image output still has a certain signal intensity, and the exposure can be reduced for saving power; on the other hand, if the displacement output number of the optical mouse apparatus 100 within the unit time is lower than a certain level, it will indicate that the sensed image output has weak signal intensity, and the exposure needs to be increased for improving the signal intensity of the sensed image output. Therefore, when the displacement output number is higher than a first number threshold NTH1, the processing unit 115 reduces the exposure of the sensed image and switches the exposure from the first exposure value range to the second exposure value range for saving power consumption, wherein the first exposure value range is higher than the second exposure value range. For instance, the first exposure value range may be the above-mentioned gray value range of 100-150, and the second exposure value range may be the above-mentioned gray value range of 70-120. However, if the displacement output number is lower than a second number threshold NTH2, the processing unit 115 increases the exposure by switching the exposure from the second exposure value range to the first exposure value range for sensed image exposure enhancement.

Figure 2:
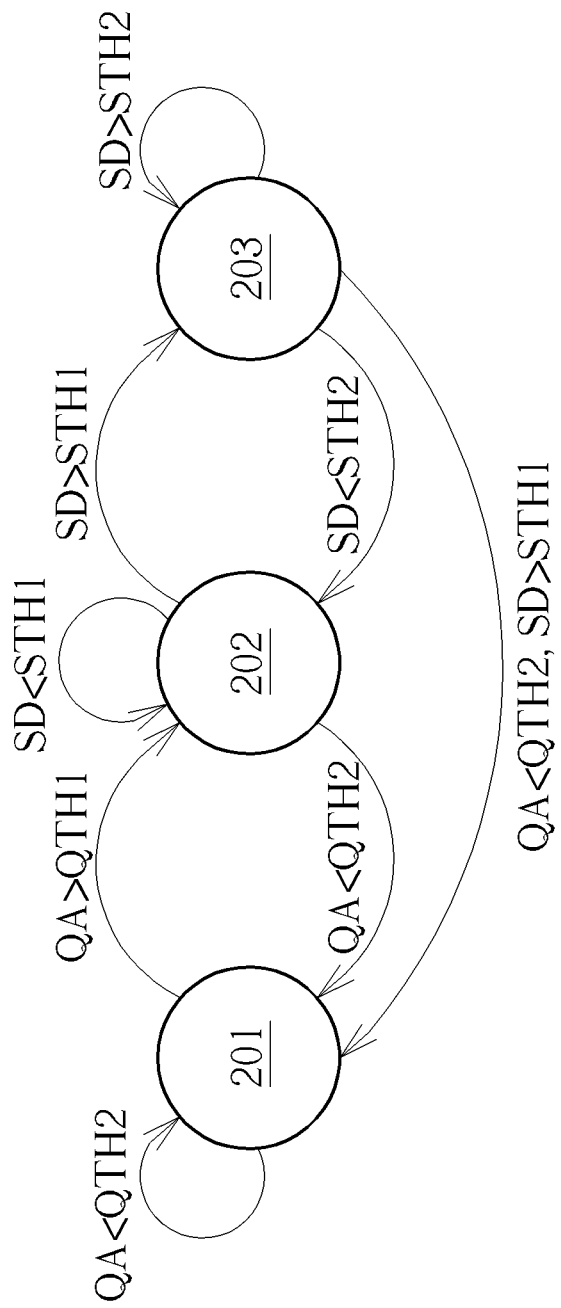
FIG. 2 is a state diagram illustrating the operation of the optical mouse apparatus which refers to the quality parameter and the moving speed simultaneously.
Figure 3:
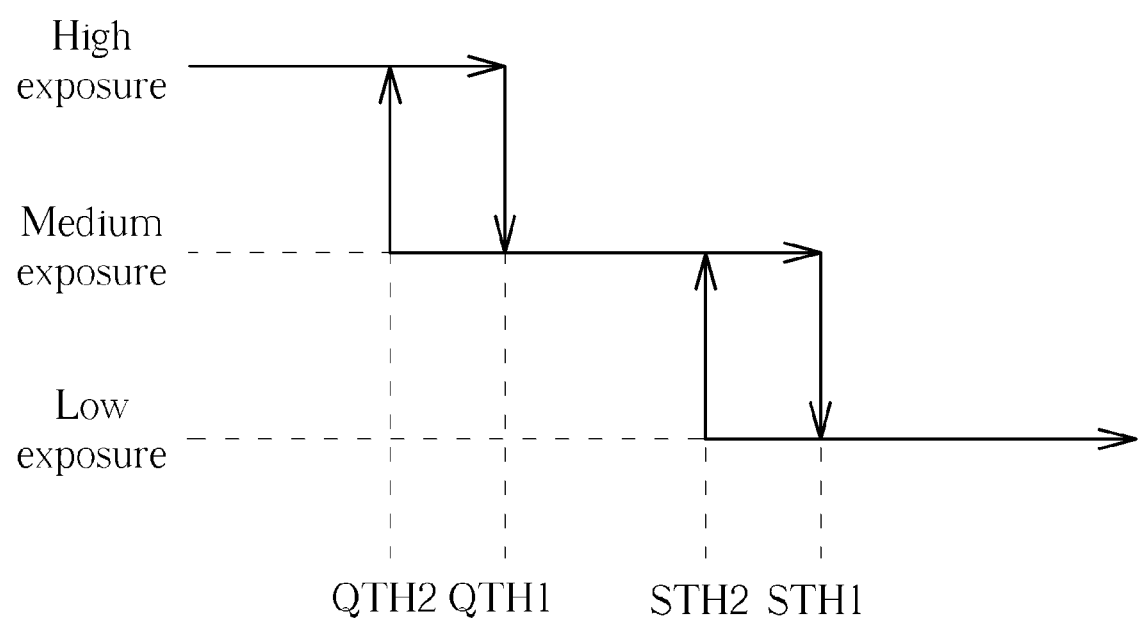
FIG. 3 is a diagram illustrating the exposure adjustment of the optical mouse apparatus which refers to the quality parameter and the moving speed simultaneously.

Therefore, as can be readily known from above-mentioned embodiments, the processing unit 115 of the present invention adjusts the exposure of the sensed image output in accordance with the quality parameter (e.g., SNR) of the sensed image from the sensing unit 110, the moving speed (e.g., the actual moving speed of the mouse or the moving speed of the mouse cursor), or the displacement output number within a unit time. Moreover, the process of dynamically adjusting the exposure of the light source unit 105 can also be performed according to the quality parameter, the moving speed, or the displacement output number within a unit time. Please refer to FIG. 2 in conjunction with FIG. 3. FIG. 2 is a state diagram illustrating the operation of the optical mouse apparatus 100 which refers to the quality parameter and the moving speed simultaneously. FIG. 3 is a diagram illustrating the exposure adjustment of the optical mouse apparatus 100 which refers to the quality parameter and the moving speed simultaneously. As can be seen in FIG. 2, the optical mouse apparatus 100 includes three different states corresponding to three different exposure value ranges, respectively, wherein the state 201 corresponds to the high exposure value range (e.g., the above-mentioned gray value range of 100-150), the state 202 corresponds to the medium exposure value range (e.g., the above-mentioned gray value range of 70-120), the state 203 corresponds to the low exposure value range (e.g., the above-mentioned gray value range of 40-90), QA indicates the quality parameter (e.g., SNR), and SD indicates the moving speed.

As can be seen in FIG. 3, the processing unit 115 dynamically adjusts the exposure of the sensed image in a gradual way. For instance, the processing unit 115 configures the exposure to the high exposure value range (which corresponds to the state 201). If the quality parameter QA is lower than the signal threshold QTH2, which means the sensed image quality is poorer, then the processing unit 115 remains the exposure in the high exposure value range (which corresponds to the state 201). If the quality parameter QA is higher than the signal threshold QTH1, which means the sensed image quality is better and a slight reduction of the exposure does not excessively affect the sensed image quality, then the processing unit 115 switches the exposure to the medium exposure value range (which corresponds to the state 202) for saving power. If the moving speed SD is lower than the speed threshold STH2, which means the optical mouse has low-speed movement and the displacement estimation should be more accurate, then the processing unit 115 remains the exposure in the medium exposure value range. If the moving speed SD is higher than the speed threshold STH1, which means the optical mouse has high-speed movement and the displacement estimation is not required to be so accurate and thus allows some distortion, then the processing unit 115 switches the exposure to the low exposure value range (which corresponds to the state 203) for saving power. If the process is at the state 203 and the following moving speed SD drops below the low speed threshold STH2 (which means the optical mouse has low-speed movement), then the processing unit 115 raises the exposure from the low exposure value range to the medium exposure value range (which corresponds to the state 202). If the process is at the state 202 and the quality parameter QA drops below the second signal threshold QTH2, then the processing unit 115 switches the exposure from the medium exposure value range to the high exposure value range (which corresponds to the state 201). Therefore, by means of the above-mentioned dynamical exposure switching operation, the light source unit 105 does not consume excessive current, thus achieving the objective of saving power consumption of the optical mouse apparatus 100.

Figure 4:
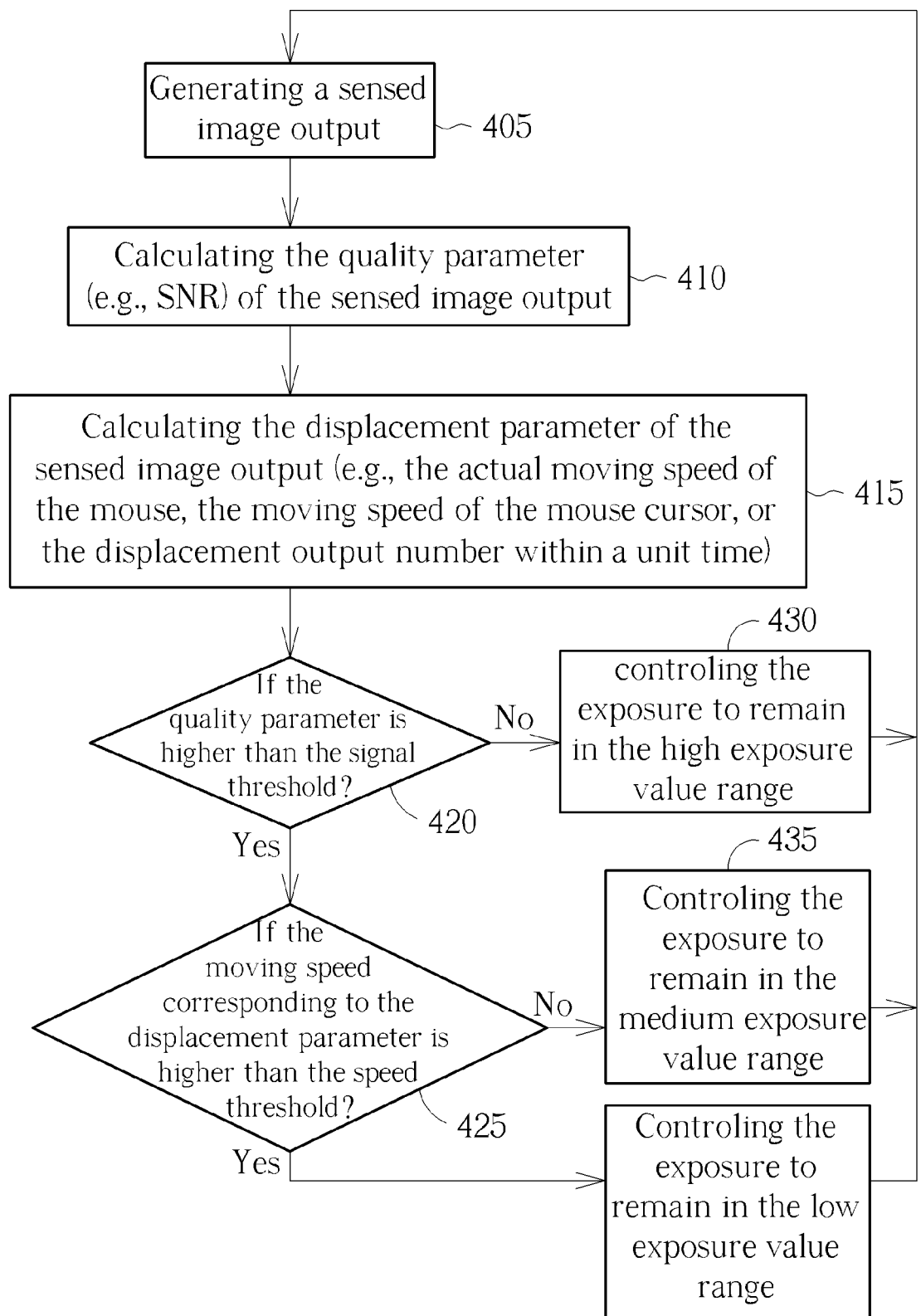
FIG. 4 is a flowchart illustrating the operation of the optical mouse apparatus which refers to the quality parameter and the moving speed simultaneously.

Please refer to FIG. 4 for better understanding of technical features of the present invention. FIG. 4 is a flowchart illustrating the operation of the optical mouse apparatus 100 which refers to the quality parameter QA and the moving speed SD simultaneously. For clarity, in this embodiment, only one signal threshold is utilized for comparing with the referenced quality parameter QA, and only one speed threshold is utilized for comparing with the moving speed SD. Provided that substantially the same result is achieved, the steps of the flowchart shown in FIG. 4 need not be in the exact order shown and need not be contiguous, that is, other steps can be intermediate. Besides, some steps in FIG. 4 may be omitted according to various embodiments or requirements. The method may be briefly summarized as follows.

Step 405: The sensing circuit 110 generates a sensed image output composed of sensed image(s);

Step 410: The processing unit 115 calculates the quality parameter (e.g., SNR) of the sensed image output;

Step 415: The processing unit 115 calculates the displacement parameter of the sensed image output (e.g., the actual moving speed of the mouse, the moving speed of the mouse cursor, or the displacement output number within a unit time);

Step 420: The processing unit 115 determines whether the quality parameter is higher than the signal threshold. If yes, the flow goes to step 425; else goes to step 430;

Step 425: The processing unit 115 determines whether the moving speed corresponding to the displacement parameter is higher than the speed threshold. If yes, the flow goes to step 440; else goes to step 435;

Step 430: The processing circuit 115 controls the exposure to remain in the high exposure value range;

Step 435: The processing circuit 115 controls the exposure to remain in the medium exposure value range; and Step 440: The processing circuit 115 controls the exposure to remain in the low exposure value range.

In present invention, the exposure can be adjusted by varying exposure time or varying the power delivered to the light source, etc.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical mouse apparatus, comprising:
a light source unit, arranged for generating and emitting an optical signal, wherein the optical signal is emitted upon a surface, and then forms an optical reflected signal;
a sensing unit, arranged for generating a sensed image output according to the optical reflected signal, wherein the sensed image output is utilized for estimating an image displacement of the optical mouse apparatus; and
a processing unit, coupled to the light source unit and the sensing unit, the processing unit arranged for controlling the light source unit to emit the optical signal, and controlling an exposure of the sensed image output to dynamically switch between at least two exposure value ranges according to the sensed image output,
wherein the processing unit adjusts the exposure of the light source unit to dynamically switch between the at least two exposure value ranges according to a quality parameter of the sensed image output, the quality parameter is a signal-to-noise ratio (SNR), when the SNR of the sensed image output is higher than a first signal threshold, the processing unit reduces the exposure of the sensed image output, and switches the exposure to a second exposure value range from a first exposure value range, and wherein the first exposure value range is higher than the second exposure value range.

2. The optical mouse apparatus of claim 1, wherein when the SNR of the sensed image output is lower than a second signal threshold, the processing unit raises the exposure of the sensed image output, and switches the exposure to the first exposure value range from the second exposure value range.

3. The optical mouse apparatus of claim 2, wherein the first signal threshold is higher than the second signal threshold.

4. The optical mouse apparatus of claim 3, wherein the displacement parameter indicates a mouse moving speed; and when the mouse moving speed is higher than a first speed threshold, the processing unit reduces the exposure of the sensed image output, and switches the exposure to a second exposure value range from a first exposure value range.

5. The optical mouse apparatus of claim 4, wherein when the mouse moving speed of the sensed image output is lower than a second speed threshold, the processing unit raises the exposure of the sensed image output, and switches the exposure to the first exposure value range from the second exposure value range.

6. The optical mouse apparatus of claim 5, wherein the first speed threshold is higher than the second speed threshold.

7. The optical mouse apparatus of claim 4, wherein the mouse moving speed is an actual moving speed of the optical mouse apparatus or a moving speed of a mouse cursor.

8. The optical mouse apparatus of claim 1, wherein the processing unit adjusts the exposure of the light source unit to switch between the at least two exposure value ranges dynamically according to a displacement parameter of the sensed image output.

9. The optical mouse apparatus of claim 8, wherein the displacement parameter indicates a displacement output number within a unit time; and when the displacement output number is higher than a first number threshold, the processing unit reduces the exposure of the sensed image output, and switches the exposure to a second exposure value range from a first exposure value range, wherein the first exposure value range is higher than the second exposure value range.

10. The optical mouse apparatus of claim 9, wherein when the displacement output number is lower than a second number threshold, the processing unit raises the exposure of the sensed image output, and switches the exposure to the first exposure value range from the second exposure value range.

11. The optical mouse apparatus of claim 10, wherein the first number threshold is higher than the second number threshold.

* * * * *